United States Patent
Youn et al.

(10) Patent No.: US 9,534,113 B2
(45) Date of Patent: *Jan. 3, 2017

(54) LOW-HARDNESS, HIGH-STRENGTH THERMOPLASTIC ELASTOMER WITH GOOD ABRASION RESISTANCE AND DIAPHRAGM INCLUDING THE SAME

(71) Applicant: Cheil Industries Inc., Gumi-si (KR)

(72) Inventors: Bum Seok Youn, Uiwang-si (KR);
Kang Yeol Park, Uiwang-si (KR);
Jong Yeun Kim, Uiwang-si (KR); Jung Wook Kim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 306 days.

This patent is subject to a terminal disclaimer.

(21) Appl. No.: 13/924,927

(22) Filed: Jun. 24, 2013

(65) Prior Publication Data

US 2013/0289158 A1 Oct. 31, 2013

Related U.S. Application Data

(63) Continuation-in-part of application No. PCT/KR2011/003837, filed on May 25, 2011.

(30) Foreign Application Priority Data

Dec. 31, 2010 (KR) .................. 10-2010-0140557
Mar. 4, 2011 (KR) .................. 10-2011-0019593

(51) Int. Cl.
| | |
|---|---|
| C08L 53/00 | (2006.01) |
| C09D 5/16 | (2006.01) |
| A61Q 19/00 | (2006.01) |
| C08K 5/54 | (2006.01) |
| C08K 3/00 | (2006.01) |
| C08K 3/26 | (2006.01) |
| C08K 3/08 | (2006.01) |
| H01B 1/22 | (2006.01) |
| C09J 7/02 | (2006.01) |
| C08L 23/02 | (2006.01) |
| C08L 71/12 | (2006.01) |
| C08L 83/00 | (2006.01) |
| C08G 77/04 | (2006.01) |

(52) U.S. Cl.
CPC ............... *C08L 53/00* (2013.01); *C08L 23/02* (2013.01); *C08L 53/005* (2013.01); *C08L 71/12* (2013.01); *C08G 77/04* (2013.01); *C08L 83/00* (2013.01)

(58) Field of Classification Search
CPC ......... C08L 53/00; C08L 53/005; C08L 23/02; C08L 83/00; C08G 77/04
See application file for complete search history.

(56) References Cited

U.S. PATENT DOCUMENTS

| | | |
|---|---|---|
| 3,278,435 A | 10/1966 | Kawahara |
| 4,772,657 A | 9/1988 | Akiyama et al. |
| 6,384,123 B1 | 5/2002 | Young |
| 7,105,611 B2 | 9/2006 | Kimura et al. |
| 7,485,682 B2 | 2/2009 | Ajbani et al. |
| 7,851,559 B2 | 12/2010 | Lee |
| 8,022,128 B2 | 9/2011 | Youn et al. |
| 8,067,495 B2 | 11/2011 | Furukawa et al. |
| 8,071,680 B2 | 12/2011 | Tasaka et al. |
| 2004/0041347 A1 | 3/2004 | Beach et al. |
| 2004/0151933 A1* | 8/2004 | Ajbani et al. ............ 428/515 |
| 2005/0288393 A1 | 12/2005 | Lean et al. |
| 2009/0124743 A1 | 5/2009 | Lee |
| 2009/0137716 A1 | 5/2009 | Furukawa et al. |
| 2009/0283973 A1 | 11/2009 | Koh et al. |
| 2010/0010141 A1* | 1/2010 | Nakamura et al. ........ 524/451 |
| 2010/0152320 A1 | 6/2010 | Youn et al. |
| 2010/0152361 A1* | 6/2010 | Weaver ........... C08F 297/08 524/528 |
| 2012/0132110 A1* | 5/2012 | Niederer-Batorfi ...... C08J 3/226 106/403 |
| 2013/0289158 A1 | 10/2013 | Youn et al. |

FOREIGN PATENT DOCUMENTS

| | | |
|---|---|---|
| CN | 101679697 A | 3/2010 |
| CN | 101747581 A | 6/2010 |
| EP | 2123708 A1 | 11/2009 |
| EP | 1561783 B1 | 12/2009 |
| JP | 2002-338779 A | 11/2002 |
| JP | 2005-132922 A | 5/2005 |
| JP | 2006-206715 A | 8/2006 |
| JP | 2006-291019 A | 10/2006 |
| KR | 10-2010-0068214 A | 6/2010 |

(Continued)

OTHER PUBLICATIONS

International Search Report in counterpart International Application No. PCT/KR2011/003837 dated Feb. 27, 2012, pp. 1-4.

(Continued)

*Primary Examiner* — Susannah Chung
*Assistant Examiner* — Robert T Butcher
(74) *Attorney, Agent, or Firm* — Additon, Higgins & Pendleton, P.A.

(57) ABSTRACT

A thermoplastic elastomer includes (A) a hydrogenated triblock copolymer, (B) a non-aromatic oil, (C) a polyolefin resin, (D) an inorganic filler, (E) a polyphenylene ether resin, and (F) a silicone resin. The thermoplastic elastomer can have good abrasion resistance and antimicrobial activity while possessing low hardness and high strength. Also provided is a molded article using the thermoplastic elastomer.

22 Claims, 2 Drawing Sheets

(56) References Cited

FOREIGN PATENT DOCUMENTS

| KR | 10-2011-0076494 A | 7/2011 |
|---|---|---|
| WO | 2006/080560 A1 | 8/2006 |
| WO | 2012/091230 A1 | 7/2012 |
| WO | 2013/089500 A1 | 6/2013 |

OTHER PUBLICATIONS

Korean Office Action in counterpart Application No. 10-2011-0049058 dated Sep. 30, 2013, pp. 1-4.
Extended European Search Report in commonly owned European Application No. 09178516.2-2109, dated Mar. 18, 2010.
International Search Report in commonly owned International Application No. PCT/KR2012/010942 dated Mar. 25, 2013, pp. 1-6.
Office Action in commonly owned U.S. Appl. No. 14/364,607 mailed Feb. 25, 2016, pp. 1-12.

\* cited by examiner

Fig. 2

| | COM (Complete) | INCOM (Incomplete) |
|---|---|---|
| Comparative Example 3 | | |
| Comparative Example 4 | | |
| Example 5 | | |
| Example 6 | | |

LOW-HARDNESS, HIGH-STRENGTH THERMOPLASTIC ELASTOMER WITH GOOD ABRASION RESISTANCE AND DIAPHRAGM INCLUDING THE SAME

CROSS-REFERENCE TO RELATED APPLICATIONS

This application is a continuation-in-part of International Application No. PCT/KR2011/003837, filed May 25, 2011, pending, which designates the U.S., published as WO 2012/091230 and is incorporated herein by reference in its entirety, and claims priority therefrom under 35 USC Section 120. This application also claims priority under 35 USC Section 119 to and the benefit of Korean Patent Application No. 10-2010-0140557, filed Dec. 31, 2010, and Korean Patent Application No. 10-2011-0019593, filed Mar. 4, 2011, the entire disclosure of each of which is incorporated herein by reference.

FIELD OF THE INVENTION

The present invention relates to a low-hardness, high-strength thermoplastic elastomer that can have good abrasion resistance, and a diaphragm including the same.

BACKGROUND OF THE INVENTION

Thermoplastic elastomers (TPEs) are materials that have rubber elasticity at room temperature like vulcanized rubbers and can be injection molded at high temperature like plastic materials. That is, thermoplastic elastomers are intermediate materials between rubbers and plastics.

Due to such characteristics, thermoplastic elastomers can be used in various applications where ductility is required, including sporting goods, food packages, medical devices, portable IT external devices, and home appliances. In addition, thermoplastic elastomers can be injection molded into articles, which are impossible to produce from vulcanized rubbers, in a short time. Furthermore, thermoplastic elastomers can also be recycled and thus cause no environmental problems, unlike vulcanized rubbers.

In recent years, attempts have been made to use thermoplastic elastomers (TPEs) as materials for door diaphragms of washing machines and dryers. Such a diaphragm is illustrated in FIG. 1. The diaphragm 10 is a member disposed between a door and a water tank of a washing machine. The diaphragm is required to have a function to absorb impact and vibration while preventing water stored in the water tank from leaking toward the door.

Thermosetting resins have been used as materials for diaphragms. Such materials are susceptible to abrasion and are impossible to recycle. Thermoplastic elastomers as materials for diaphragms should have a surface hardness (Shore A) of 50 A or less. Such low hardness enables thermoplastic elastomers to absorb vibration from motors and reduce noise during operation.

However, thermoplastic elastomers having a surface hardness (Shore A) of 50 A or less exhibit poor physical properties (such as elongation permanent set) at high temperatures compared to vulcanized rubbers, which limits their application range.

In attempts to overcome such limitations, thermoplastic elastomers have been alloyed with other resins. However, the alloys have thus far failed to provide satisfactory thermal properties at high temperatures and even lose surface ductility, which is one of the inherent advantages of thermoplastic elastomers.

U.S. Patent Publication No. 2005-0288393 discloses a thermoplastic elastomer composition including a thermoplastic resin, a block copolymer, a core-shell copolymer, and an oil. However, the composition is not suitable for use in electrical/electronic parts, particularly, diaphragms for washing machines, due to its surface hardness (Shore A) exceeding 70.

U.S. Patent Publication No. 2004-0151933 discloses a thermoplastic elastomer composition including a thermoplastic resin, a rubbery elastomer, a saturated elastomer, and an oil. However, the surface hardness (Shore A) of the thermoplastic elastomer composition cannot be maintained at 50 A or less, which limits the use of the composition.

SUMMARY OF THE INVENTION

The present invention provides a thermoplastic elastomer that can have low hardness and high strength as well as good abrasion resistance. The present invention also provides a thermoplastic elastomer that can have good heat resistance, chemical resistance, processability and/or antimicrobial activity as well as excellent physical properties at room temperature and high temperature and high resilience. The present invention further provides a thermoplastic elastomer that can be highly releasable and can exhibit excellent surface properties, such as no local gloss. Still further, the present invention can provide a thermoplastic elastomer that is particularly suitable for use in a diaphragm.

The present invention also provides a molded article using the thermoplastic elastomer.

The thermoplastic elastomer includes (A) a hydrogenated triblock copolymer, (B) a non-aromatic oil, (C) a polyolefin resin, (D) an inorganic filler, (E) a polyphenylene ether resin, and (F) a silicone resin.

In one embodiment, the thermoplastic elastomer may further include (G) a metal (oxide)-containing agent.

In one embodiment, the thermoplastic elastomer may have a surface hardness (Shore A) of about 0.1 to about 50 A, as measured in accordance with KS M 6518.

In one embodiment, the thermoplastic elastomer may include: about 100 parts by weight of a base resin including about 25 to about 55% by weight of the hydrogenated triblock copolymer (A), about 20 to about 50% by weight of the non-aromatic oil (B), about 5 to about 15% by weight of the polyolefin resin (C), about 5 to about 20% by weight of the inorganic filler (D), and about 3 to about 15% by weight of the polyphenylene ether resin (E); and about 0.01 to 5 parts by weight of the silicone resin (F).

In a further embodiment, the thermoplastic elastomer may further include about 0.1 to about 3 parts by weight of a metal (oxide)-containing agent (G), based on about 100 parts by weight of the base resin.

The hydrogenated triblock copolymer (A) may include about 20 to about 35% by weight of an aromatic vinyl polymer block.

In one embodiment, the hydrogenated triblock copolymer (A) may have a weight average molecular weight of about 200,000 to about 500,000 g/mol.

The non-aromatic oil (B) may include a paraffin oil.

The polyolefin resin (C) may have a melt index (230° C., 2.16 kg) of about 10 to about 50 g/10 min.

The inorganic filler (D) may include calcium carbonate, talc, clay, silica, mica, carbon black, graphite, wollastonite, carbon nanotubes, calcium silicate, magnesium carbonate, or a combination thereof.

The polyphenylene ether resin (E) may have a weight average molecular weight of about 20,000 to about 60,000 g/mol.

The silicone resin (F) may be composed of a polyolefin and a silicone rubber in a weight ratio of about 1:0.5 to about 1:1.5.

The metal (oxide) may include silver, gold, platinum, iron, chromium, nickel, copper, palladium, tin, cobalt, zinc, titanium, zirconium, hafnium, vanadium, niobium, molybdenum, tungsten, manganese, rhodium, lead, antimony, tin; an oxide thereof; or an alloy of two or more thereof.

The metal (oxide) may have an average particle diameter (D50) of about 1 to about 100 nm.

The thermoplastic elastomer may further include a silicone oil.

The thermoplastic elastomer may further include one or more additives selected from the group consisting of antimicrobial agents, heat stabilizers, antioxidants, release agents, light stabilizers, surfactants, coupling agents, plasticizers, admixtures, colorants, stabilizers, lubricants, antistatic agents, toning agents, flame-proofing agents, weather stabilizers, UV absorbers, UV blocking agents, flame retardants, fillers, nucleating agents, adhesion aids, adhesives, and combinations thereof.

The present invention further provides a molded article including the thermoplastic elastomer.

In one embodiment, the molded article may be a diaphragm. In one embodiment, the diaphragm may have a tensile strength of about 63 kgf/cm² or more, as measured at 23° C. in accordance with ASTM D638, and an abrasion loss of about 0.2 g or less, as measured with ASTM D1175 (1000 cycles).

The thermoplastic elastomer of the present invention can have low hardness and high strength as well as good abrasion resistance. The thermoplastic elastomer of the present invention further can have good heat resistance, chemical resistance, processability and/or antimicrobial activity as well as excellent physical properties at room temperature and high temperature and high resilience. The thermoplastic elastomer of the present invention can be highly releasable and can exhibit excellent surface properties. Due to these advantages, the thermoplastic elastomer of the present invention is suitable for the production of a molded article, particularly a diaphragm.

DESCRIPTION OF DRAWINGS

FIG. 2 contains photographs showing test results for the antifungal activity of thermoplastic elastomers prepared in Comparative Examples 3-4 and Examples 5-6.

DETAILED DESCRIPTION OF THE INVENTION

Figure 1:
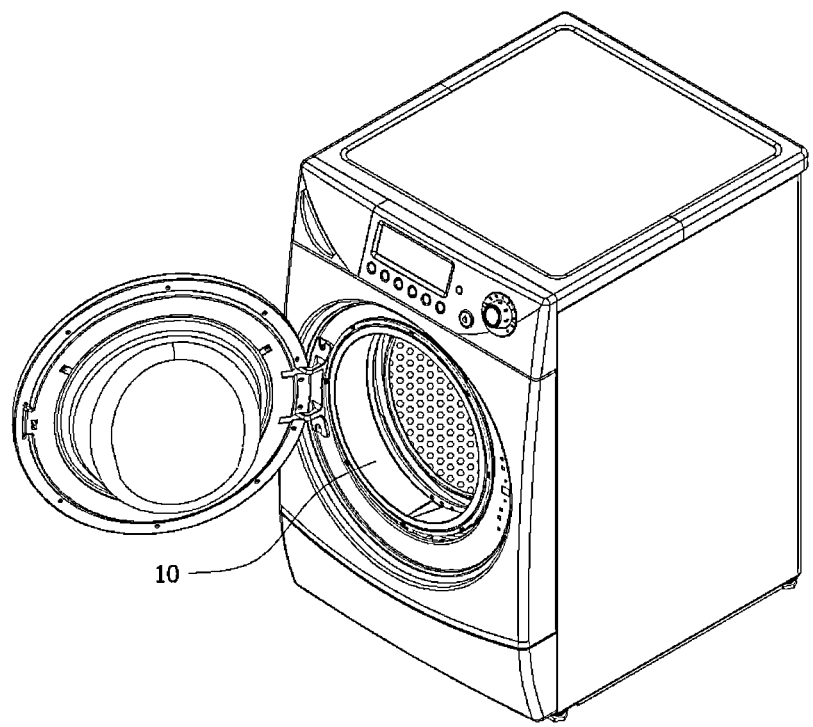
FIG. 1 schematically illustrates a diaphragm of a washing machine door.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a thermoplastic elastomer including (A) a hydrogenated triblock copolymer, (B) a non-aromatic oil, (C) a polyolefin resin, (D) an inorganic filler, (E) a polyphenylene ether resin, and (F) a silicone resin A detailed description will be given regarding the individual components of the thermoplastic elastomer.

(A) Hydrogenated Triblock Copolymer

The hydrogenated block copolymer is a block polymer in which a copolymer including an aromatic vinyl compound and a conjugated diene compound is hydrogenated. The hydrogenated block copolymer is used to obtain surface ductility of the thermoplastic elastomer.

In the structure of the block copolymer, the aromatic vinyl compound may be a hard segment and the hydrogenated conjugated diene compound may be a soft segment. The hard segment prevents deformation of thermoplasticity and the soft segment exhibits rubbery properties. Various characteristics, such as surface hardness, chemical resistance and abrasion resistance, can be achieved according to the kinds, contents, molecular weights and arrangements of the hard segment and the soft segment.

In one embodiment, the block copolymer may have a specific structure, for example, an A-B-C-A type structure where A represents a hard segment and B and C represent soft segments.

Examples of the aromatic vinyl compound corresponding to the hard segment may include without limitation styrene, $C_1$-$C_{10}$ alkyl-substituted styrenes, halogenated styrenes, and the like, and combinations thereof. Specific examples of alkyl-substituted styrenes may include without limitation o-ethylstyrene, m-ethylstyrene, p-ethylstyrene, α-methylstyrene, and the like, and combinations thereof. The aromatic vinyl compounds may be in the form of monomers. Alternatively, polymers of the aromatic vinyl compounds may be used.

The hydrogenated conjugated diene compound corresponding to the soft segment may have 4 to 9 carbon atoms. Examples thereof may include without limitation butadiene, isoprene, ethylene-butadiene, ethylene-butylene, ethylene-isoprene, isoprene-butadiene, and the like, and combinations thereof. The hydrogenated conjugated diene compounds may be in the form of monomers. Alternatively, polymers of the hydrogenated conjugated diene compounds may be used.

The hydrogenated triblock copolymer may include about 20 to about 35% by weight of the aromatic vinyl polymer block. In one embodiment, the hydrogenated triblock copolymer may comprise about 20 to about 35% by weight of the aromatic vinyl polymer block and about 65 to about 80% by weight of the conjugated diene block, for example, about 27 to about 35% by weight of the aromatic vinyl polymer block and about 65 to about 73% by weight of the conjugated diene block. Within these ranges, good elasticity and low surface hardness can be obtained.

In some embodiments, the hydrogenated triblock copolymer may include the aromatic vinyl polymer block in an amount of about 20, 21, 22, 23, 24, 25, 26, 27, 28, 29, 30, 31, 32, 33, 34, or 35% by weight. Further, according to some embodiments of the present invention, the amount of the aromatic vinyl polymer block can be in a range from about any of the foregoing amounts to about any other of the foregoing amounts.

In some embodiments, the hydrogenated triblock copolymer may include the conjugated diene block in an amount of about 65, 66, 67, 68, 69, 70, 71, 72, 73, 74, 75, 76, 77, 78, 79, or 80% by weight. Further, according to some embodiments of the present invention, the amount of the conjugated diene block can be in a range from about any of the foregoing amounts to about any other of the foregoing amounts.

Specific examples of the block copolymer may include, but are not limited to, styrene-ethylene-butylene-styrene (SEBS) block copolymers, styrene-ethylene-propylene-styrene (SEPS) block copolymers, styrene-ethylene-ethylene-propylene-styrene (SEEPS) block copolymers, and the like, and combinations thereof.

The block copolymer may have a weight average molecular weight of about 200,000 to about 500,000 g/mol, for example about 230,000 to about 400,000 g/mol. When the weight average molecular weight of the block copolymer is within the range defined above, high tensile strength and elongation can be ensured at low surface hardness.

The hydrogenated triblock copolymer may be included in an amount of about 25 to about 55% by weight, for example about 27 to about 45% by weight, based on 100% by weight of a base resin including (A), (B), (C), (D), and (E). In some embodiments, the base resin may include the hydrogenated triblock copolymer in an amount about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55% by weight. Further, according to some embodiments of the present invention, the amount of the hydrogenated triblock copolymer can be in a range from about any of the foregoing amounts to about any other of the foregoing amounts.

Within this range, good surface ductility, heat resistance, chemical resistance, and the like can be ensured.

(B) Non-aromatic Oil

The non-aromatic oil functions to soften the thermoplastic elastomer and is used to improve elongation of the thermoplastic elastomer.

The non-aromatic oil may have a weight average molecular weight of about 400 to about 1,200 g/mol, for example about 600 to about 900 g/mol. Within this range, mixing upon extrusion can be advantageously performed.

The non-aromatic oil may have a kinematic viscosity of about 95 to about 215 cSt at 40° C., for example about 100 to about 210.5 cSt at 40° C. Within this range, mixing upon extrusion can be advantageously performed.

The non-aromatic oil may have a specific gravity (15/4° C.) of about 0.75 to about 0.95 g/cm$^3$, for example about 0.85 to about 0.9 g/cm$^3$. The non-aromatic oil may have a flash point of about 250 to about 330° C., for example about 270 to about 300° C. The non-aromatic oil may have a pour point of about −18 to about −9° C.

In one embodiment, the non-aromatic oil may include a paraffin oil. In exemplary embodiments, the non-aromatic oil includes about 50% by weight or more of a paraffin oil, for example about 65% by weight or more of a paraffin oil. In one embodiment, the non-aromatic oil may be a mixture of a paraffin oil and a naphthene oil.

The non-aromatic oil may be included in an amount of about 20 to about 50% by weight, for example about 30 to about 45% by weight, based on 100% by weight of the base resin including (A), (B), (C), (D), and (E). In some embodiments, the base resin may include the non-aromatic oil in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the non-aromatic oil can be in a range from about any of the foregoing amounts to about any other of the foregoing amounts.

The use of the non-aromatic oil in an amount within the range defined above can be advantageous in terms of elongation, processability, heat resistance, and chemical resistance.

The amount of the non-aromatic oil (B) in the thermoplastic elastomer can be greater than that of the hydrogenated triblock copolymer (A). This can have the advantages of low hardness and high elongation. In one embodiment, the weight ratio of the hydrogenated triblock copolymer (A) to the non-aromatic oil (B) may be about 1:1.1 to about 2.5:1.

(C) Polyolefin Resin

The polyolefin resin is used to improve the mechanical properties and injection-molding processability of the thermoplastic elastomer. Various characteristics of the thermoplastic elastomer can be achieved according to the shape, molecular weight, density, melt index, mechanical properties, etc. of the polyolefin resin.

Examples of the polyolefin resin may include without limitation polyethylene resins, polypropylene resins, polybutylene resins, ethylene-propylene copolymer resins, ethylene-vinyl alcohol copolymer resins, and the like, and combinations thereof. In exemplary embodiments, a polypropylene resin can be used. The polypropylene resin may be a homopolypropylene resin, which can be advantageous due to its high tensile strength.

The polyolefin resin may have a melt index (230° C., 2.16 kg) of about 10 to about 50 g/10 min, for example about 15 to about 30 g/10 min. This range can ensure high flowability, which can be advantageous in the production of an injection-molded article.

The polyolefin resin may have a density of about 0.85 to about 1.1 g/cm$^3$ and a tensile strength (yield point, 50 mm/min) of about 300 to about 380 kg/cm$^2$. These ranges can ensure high tensile strength of the thermoplastic elastomer.

The polyolefin resin may be included in an amount of about 5 to about 15% by weight, for example about 6 to about 12% by weight, based on 100% by weight of the base resin including (A), (B), (C), (D), and (E). In some embodiments, the base resin may include the polyolefin resin in an amount of about 5, 6, 7, 8, 9, 10, 11, 12, 13, 14, or 15% by weight. Further, according to some embodiments of the present invention, the amount of the polyolefin resin can be in a range from about any of the foregoing amounts to about any other of the foregoing amounts.

The use of the polyolefin resin in an amount within the range defined above can ensure good resistance to heat and chemicals, etc.

(D) Inorganic Filler

The inorganic filler is used to improve the processability of the thermoplastic elastomer.

The inorganic filler may be in the form of particles or fibers. In exemplary embodiments, the inorganic filler can be in the form of particles. In this case, the inorganic filler may have an average particle size of about 0.01 to about 5 μm. Within this range, high tensile strength of the thermoplastic elastomer at high temperature can be obtained.

Examples of inorganic fillers suitable for use in the thermoplastic elastomer may include, but are not limited to, calcium carbonate, talc, clay, silica, mica, carbon black, graphite, wollastonite, carbon nanotubes, calcium silicate, magnesium carbonate and the like. These inorganic fillers may be used alone or as a mixture of two or more thereof. In exemplary embodiments, calcium carbonate and/or talc can be used, for example calcium carbonate can be used.

The inorganic filler may be uncoated or coated with a surface modifier such as a coupling agent. In exemplary embodiments the inorganic filler can be uncoated.

The inorganic filler may be included in an amount of about 5 to about 20% by weight, for example about 10 to about 17% by weight, based on 100% by weight of the base resin including (A), (B), (C), (D), and (E). In exemplary embodiments, the inorganic filler (D) can be present in a larger amount than the polyolefin resin (C). In some embodiments, the base resin may include the inorganic filler in an amount of about 5, 6, 7, 8, 9, 10, 11, 12, 13, 14, 15, 16, 17, 18, 19, or 20% by weight. Further, according to some embodiments of the present invention, the amount of the inorganic filler can be in a range from about any of the foregoing amounts to about any other of the foregoing amounts.

When the amount of the inorganic filler is within the range defined above, improved mechanical properties and good resistance to heat and chemicals can be obtained.

(E) Polyphenylene Ether Resin

The use of the polyphenylene ether resin can contribute to further improvements in the high-temperature ductility, surface hardness, resilience, etc. of the thermoplastic elastomer.

The polyphenylene ether resin may be used alone or as a mixture with a vinyl aromatic polymer.

Examples of the polyphenylene ether resin may include without limitation poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymers of poly(2,6-dimethyl-1,4-phenylene)ether and poly(2,3,6-trimethyl-1,4-phenylene)ether, copolymers of poly(2,6-dimethyl-1,4-phenylene)ether and poly(2,3,6-triethyl-1,4-phenylene)ether, and the like, and combinations thereof. In exemplary embodiments, poly(2,6-dimethyl-1,4-phenylene)ether and/or a copolymer of poly(2,6-dimethyl-1,4-phenylene)ether and poly(2,3,6-trimethyl-1,4-phenylene)ether can be used, for example, poly(2,6-dimethyl-1,4-phenylene)ether can be used.

Examples of the vinyl aromatic polymer may include without limitation a polymer of one or more vinyl aromatic monomers, such as styrene, p-methylstyrene, α-methylstyrene, 4-N-propyl styrene, and the like, and combinations thereof. In exemplary embodiments, a polymer of styrene and α-methylstyrene can be used.

The degree of polymerization of the polyphenylene ether resin is not specifically limited and is determined taking into consideration the thermal stability or workability of the resin composition. The polyphenylene ether resin may have a degree of polymerization corresponding to an intrinsic viscosity of about 0.2 to about 0.8 dl/g, as measured in chloroform as a solvent at 25° C.

The polyphenylene ether resin may have a weight average molecular weight of about 20,000 to about 60,000 g/mol, for example about 22,000 to about 40,000 g/mol. Within this range, the thermoplastic elastomer can exhibit excellent mechanical properties, such as good resistance to heat and chemicals, and can be highly processable.

The molecular weight and amount of the polyphenylene ether resin may be determined depending on those of the aromatic vinyl compound corresponding to the hard segment of the hydrogenated triblock copolymer (A).

The polyphenylene ether resin may be included in an amount of about 3 to about 15% by weight, for example about 5 to about 11% by weight, based on 100% by weight of the base resin including (A), (B), (C), (D), and (E). In some embodiments, the base resin may include the polyphenylene ether resin in an amount of about 3, 4, 5, 6, 7, 8, 9, 10, 11, 12, 13, 14, or 15% by weight. Further, according to some embodiments of the present invention, the amount of the polyphenylene ether resin can be in a range from about any of the foregoing amounts to about any other of the foregoing amounts.

The amount of the polyphenylene ether resin can depend on the styrene content of the hydrogenated triblock copolymer.

The use of the polyphenylene ether resin in an amount within the range defined above can be advantageous in terms of high-temperature ductility, surface hardness, resilience, and/or processability.

The polyphenylene ether resin (E) can be present in a larger amount than the polyolefin resin (C). In this case, good abrasion resistance can be obtained.

(F) Silicone Resin

The silicone resin is used to improve the abrasion resistance of the thermoplastic elastomer. The use of even a small amount of the silicone resin can result in significant improvement of abrasion resistance.

The silicone resin may be a blend of a silicone rubber and a polyolefin, which is available in the form of a masterbatch.

In one embodiment, the polyolefin and the silicone rubber may be in a weight ratio of about 1:0.5 to about 1:1.5. Within this range, the silicone resin can have high stiffness and good impact resistance and can be highly dispersible during preparation of the thermoplastic elastomer.

Examples of the polyolefin may include without limitation polyethylenes, polypropylenes, ethylene-propylene copolymers, and the like, and combinations thereof. In exemplary embodiments, the polyolefin may include polypropylene due to its high tensile strength.

The polyolefin may have a weight average molecular weight of about 35,000 to about 40,000 g/mol, a melt index (190° C., 2.6 kg) of about 25 to about 40 g/10 min, and an intrinsic viscosity of about 1.1 to about 1.2 dL/g.

The silicone rubber used in the silicone resin uses a siloxane compound. The siloxane compound may be a cyclosiloxane. Examples of such cyclosiloxanes may include without limitation hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These cyclosiloxanes may be used alone or as a mixture of two or more thereof. In this case, a silane compound, such as trimethoxymethylsilane, triethoxyphenylsilane, tetramethoxysilane and/or tetraethoxysilane, may be used as a curing agent.

The silicone rubber may have a weight average molecular weight of about 80,000 to about 100,000 g/mol and a specific gravity of about 0.95 to about 0.98 g/cm$^3$.

The thermoplastic elastomer may include the silicone resin in an amount of about 0.01 to about 5 parts by weight, for example about 0.1 to about 1.5 parts by weight, based on about 100 parts by weight of the base resin including (A), (B), (C), (D), and (E). In some embodiments, the thermoplastic elastomer may include the silicone resin in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight. Further, according to some embodiments of the present invention, the amount of the silicone resin can be in a range from about any of the foregoing amounts to about any other of the foregoing amounts.

This range can provide good processability and abrasion resistance as well as excellent high-temperature ductility, surface hardness and resilience.

(G) Metal (Oxide)-Containing Agent

The thermoplastic elastomer of the present invention may further include a metal (oxide)-containing agent. The metal (oxide)-containing agent may be a dispersion of a metal (oxide) in a vehicle. The metal (oxide) may be a metal, a metal oxide, or a combination thereof. For example, the metal (oxide) may be silver, gold, platinum, aluminum, iron, chromium, nickel, copper, palladium, tin, cobalt, zinc, titanium, zirconium, hafnium, vanadium, niobium, molybdenum, tungsten, manganese, rhodium, lead, antimony, tin; an oxide thereof; an alloy of two or more thereof; or a mixture of two or more thereof.

The metal (oxide) may have an average particle diameter (D50) of about 1 to about 100 nm, for example about 10 to about 80 nm. Within this range, the metal (oxide) can be effectively dispersed, contributing to further improvement of antimicrobial activity.

In one embodiment, the metal (oxide) may be supported on a carrier. The carrier may be, for example, silica, alumina, zeolite and the like. In an alternative embodiment, the metal (oxide) may be coated or plated on carrier particles. In another embodiment, the metal or metal oxide may be used alone without using a carrier. The carrier may have a size of about 50 to about 500 nm.

The vehicle may be, for example, glycerin, a mineral oil and the like. The combined use of the metal (oxide) with the vehicle can lead to better dispersibility and workability and uniform quality.

The amount of the metal (oxide) in the metal (oxide)-containing agent can be about 1 to about 30,000 ppm, for example from about 10 to about 25,000 ppm.

The thermoplastic elastomer may include the metal (oxide)-containing agent in an amount of about 0.1 to about 3 parts by weight, for example about 0.5 to about 1.5 parts by weight, based on about 100 parts by weight of the base resin including (A), (B), (C), (D), and (E). In some embodiments, the thermoplastic elastomer may include the metal (oxide)-containing agent in an amount of about 0.1, 0.2, 0.3, 0.4, 0.5, 0.6, 0.7, 0.8, 0.9, 1, 1.5, 2, 2.5, or 3 parts by weight. Further, according to some embodiments of the present invention, the amount of the metal (oxide)-containing agent can be in a range from about any of the foregoing amounts to about any other of the foregoing amounts.

Within this range, good abrasion resistance and antimicrobial activity, together with excellent mechanical properties, can be ensured.

(H) Silicone Oil

The thermoplastic elastomer of the present invention may further include a silicone oil. The silicone oil may be a polydimethylsiloxane; a modified polysiloxane in which at least one side chain or terminal methyl group of a polydimethylsiloxane is modified with a hydrogen atom, an alkyl group, a cyclohexyl group, a phenyl group, a benzyl group, an epoxy group, a polyether group, a carboxyl group, a mercapto group, a chloroalkyl group, an alkyl alcohol ester group, an alcohol group, an allyl group, a vinyl group, a trifluoromethyl group or a combination thereof or a combination thereof.

The thermoplastic elastomer may include the silicone oil in an amount of about 0.5 to about 2 parts by weight, for example about 0.7 to about 2 parts by weight, based on about 100 parts by weight of the base resin including (A), (B), (C), (D), and (E). In some embodiments, the thermoplastic elastomer may include the silicone oil in an amount of about 0.5, 0.6, 0.7, 0.8, 0.9, 1, or 2 parts by weight. Further, according to some embodiments of the present invention, the amount of the silicone oil can be in a range from about any of the foregoing amounts to about any other of the foregoing amounts.

When the amount of the silicone oil is within the range defined above, excellent surface characteristics can be exhibited without deterioration of physical properties at room temperature and high temperature.

In addition to the above components, the thermoplastic elastomer of the present invention may further include one or more additives known in the art. Examples of such additives may include without limitation antimicrobial agents, heat stabilizers, antioxidants, release agents, light stabilizers, surfactants, coupling agents, plasticizers, admixtures, colorants, stabilizers, lubricants, antistatic agents, toning agents, flame-proofing agents, weather stabilizers, UV absorbers, UV blocking agents, flame retardants, fillers, nucleating agents, adhesion aids, adhesives, and the like. These additives may be used alone or in combination of two or more thereof.

Suitable antioxidants may include phenol type antioxidants, phosphite type antioxidants, thioether type antioxidants, amine type antioxidants, and the like, and combinations thereof. Suitable release agents may include without limitation fluorine-containing polymers, metal salts of stearic acid, metal salts of montanic acid, montanic acid ester waxes, polyethylene waxes, and the like, and combinations thereof. Suitable weather stabilizers may include without limitation benzophenone type weather stabilizers, amine type weather stabilizers, and the like, and combinations thereof. Suitable colorants may include without limitation dyes, pigments, and the like, and combinations thereof. Suitable UV blockers may include without limitation titanium dioxide ($TiO_2$), carbon black, and the like, and combinations thereof. Suitable nucleating agents may include without limitation talc, clay, and the like, and combinations thereof.

The additives may be included in such an amount as not to deteriorate the physical properties of the thermoplastic elastomer. In exemplary embodiments, the additives can be included in an amount of about 40 parts by weight or less, for example about 0.1 to about 30 parts by weight, based on about 100 parts by weight of the base resin including (A), (B), (C), (D), and (E).

The thermoplastic elastomer may have a surface hardness (Shore A) of 50 A or less, for example about 0.1 A to about 49 A, and as another example about 10 A to about 45 A, as measured in accordance with KS M 6518.

In one embodiment, the thermoplastic elastomer may be prepared by any suitable method known in the art for the production of a resin composition. For example, the thermoplastic elastomer may be prepared by simultaneously mixing all the components and optionally the additives, melt-extruding the mixture using an extruder, and pelletizing the extrudate. In one embodiment, the mixture may be extruded using a twin-screw extruder (L/D=about 20-60, Φ=32 mm, 70 mm) at a fixed temperature of about 240° C., a screw rotation speed of about 300 to about 600 rpm and a self-supply speed of about 60 to about 600 kg/hr to produce pellets.

The present invention also provides a molded article produced by molding the thermoplastic elastomer. The molded article of the present invention may be produced by various molding processes, such as injection molding, blow molding, extrusion molding, and thermoforming.

The molded article of the present invention can find application in various fields, such as electrical/electronic parts and automotive components, that require high-temperature ductility, surface hardness, resilience, heat resistance, chemical resistance, processability and/or abrasion resistance. The molded article of the present invention is particularly useful as a diaphragm for a washing machine or a dryer.

In one embodiment, the diaphragm may have a tensile strength of about 63 kgf/cm$^2$ or more, for example about 68 to about 100 kgf/cm$^2$ as measured at 23° C. in accordance with ASTM D638, and an abrasion loss of about 0.2 g or less, for example less than about 0.15 g, as another example less than about 0.1 g, and as another example about 0.001 g to about 0.08 g, as measured in accordance with ASTM D1175 (1000 cycles).

The present invention will be explained in more detail with reference to the following examples. These examples are provided for illustration only and are not to be in any way construed as limiting the present invention.

A description of details apparent to those skilled in the art will be omitted.

EXAMPLES

Detailed specifications of components used in Examples 1-7 and Comparative Examples 1-5 are as follows:

(A) Hydrogenated Triblock Copolymer

A styrene-ethylene-butylene-styrene (SEBS) block copolymer (G1651, KRATON) is used. The block copolymer includes 33 wt % of styrene corresponding to a hard segment, and 67 wt % of ethylene-butylene corresponding to a soft segment. The block copolymer has a weight average molecular weight of 270,000 g/mol.

(A') An ethylene-propylene-diene rubber (EPDM) (DONG-A HWA SUNG Co., Ltd.) is used.

(B) Non-aromatic Oil

A paraffin oil (KL-900, SEOJIN CHEMICAL Co., Ltd.) is used. The paraffin oil has a weight average molecular weight of 740 g/mol, a specific gravity (15/4° C.) of 0.88, a flash point of 290° C. or more, and a kinematic viscosity of 171 cSt at 40° C.

(C) Polyolefin Resin

A homopolypropylene resin (HJ-700, SAMSUNG TOTAL) is used. The homopolypropylene resin has a melt index (230° C., 2.16 kg) of 22 g/10 min, a density of 0.91 g/cm$^3$, and a tensile strength (yield point, 50 mm/min) of 380 kg/cm$^2$.

(D) Inorganic Filler

Calcium carbonate (Omya 2-HB, OMYA) is used. The inorganic filler has a particle size of 2 μm.

(E) Polyphenylene Ether Resin

A polyphenylene ether resin (PPE, ASAHI KASEI) is used. The resin has a weight average molecular weight of 25,000 g/mol.

(F) Silicone Resin

MB50-001 (Dow-Corning) is used.

(G) Metal (Oxide)-Containing Agent

A silica silver complex (Actosil, ACT Co., Ltd.) is used. The product is a dispersion of Ag-coated silica (75 nm) in glycerin.

(H) Silicone Oil

PMX-200 1000cs (Dow-Corning) is used.

Examples 1-2

The components are mixed in the amounts shown in Table 1. Each of the mixtures is extruded using a twin-screw extruder (L/D=20-60, Φ=32 mm, 70 mm) at a fixed temperature of 240° C., a screw rotation speed of 300-600 rpm and a self-supply speed of 60-600 kg/hr to produce pellets. The pellets are dried at 80° C. for 4 hr and molded into specimens using a 10 oz injection molding machine at 240° C. The physical properties of the specimens are measured by the following methods. The results are shown in Table 1.

Comparative Example 1

The procedure of Example 1 is repeated except that the silicone resin (F) is not used.

Comparative Example 2

The procedure of Example 1 is repeated except that an ethylene-propylene-diene rubber (DONG-A HWA SUNG Co., Ltd.) as a thermosetting rubber is used instead of the constituent components.

TABLE 1

|  |  | Example 1 | Example 2 | Comparative Example 1 | Comparative Example 2 |
|---|---|---|---|---|---|
| (A) Block copolymer (wt %) | | 31.5 | 31.5 | 31.5 | — |
| (A') EPDM | | — | — | — | 100 |
| (B) Paraffin oil (wt %) | | 40.5 | 40.5 | 40.5 | — |
| (C) Polyolefin resin (wt %) | | 9.9 | 9.9 | 9.9 | — |
| (D) Inorganic filler (wt %) | | 12.6 | 12.6 | 12.6 | — |
| (E) PPE (wt %) | | 4.5 | 4.0 | 5.5 | — |
| (F) Silicone resin (wt %) | | 1.0 | 1.5 | — | — |
| Surface hardness (Shore A) | | 43 | 49 | 43 | 45 |
| Abrasion loss (g) | Test-1 | 0.13 | 0.12 | 0.26 | 0.21 |
| | Test-2 2000 cycles | 0.07 | 0.07 | 0.39 | 0.42 |
| | 4000 cycles | 0.13 | 0.13 | 0.82 | 0.80 |
| | 8000 cycles | 0.37 | 0.37 | 1.60 | 1.58 |
| | 12000 cycles | 0.49 | 0.49 | 2.40 | 2.43 |

As can be seen from the results in Table 1, the thermoplastic elastomers of Examples 1 and 2 have surface hardness (Shore A) values not higher than 50 A, indicating excellent surface hardness characteristics, and have good abrasion resistance. In contrast, the thermoplastic elastomer of Comparative Example 1, which did not use the silicone resin (F), and the thermoplastic elastomer of Comparative Example 2 using the ethylene-propylene-diene rubber as a thermosetting rubber have poor abrasion resistance.

Examples 3-7

The components are mixed in the amounts as shown in Table 2. Each of the mixtures is kneaded using a Banbury mixer at a fixed temperature of 240° C. and 40 rpm for 25 min, and extruded using a twin-screw extruder (L/D=48, Φ=75 mm) at a temperature of 240-270° C., a screw rotation speed of 450 rpm and a self-supply speed of 500 kg/hr to produce pellets. The pellets are dried at 80° C. for 4 hr and molded into specimens using a 10 oz injection molding machine at 240° C. The physical properties of the specimens are measured by the following methods. The results are shown in Table 2.

Comparative Example 3

The procedure of Example 3 is repeated except that an ethylene-propylene-diene rubber (DONG-A HWA SUNG Co., Ltd.) as a thermosetting rubber is used instead of the constituent components.

Comparative Example 4

The procedure of Example 3 is repeated except that the silicone resin (F) and the metal (oxide)-containing agent (G) are not used.

Comparative Example 5

The procedure of Example 3 is repeated except that the silicone resin (F) is not used.

TABLE 3-continued

| Criteria for judgment | 0 | No growth was observed under microscope |
|---|---|---|
| | 1 | No growth was observed with naked eyes |
| | 2 | Growth of 25% or less on specimen |
| | 3 | Growth of 50% or less on specimen |
| | 4 | Growth of 25% or more on specimen |
| | 5 | Growth over the entire surface of specimen |

Each of the diaphragm specimens is placed in a nutrient medium, and a suspension of fungal spores and a nutrient is inoculated into the surface of the specimen. Test conditions are shown Table 4.

TABLE 2

((A)-(E) are expressed in wt %, (F)-(H) are expressed in parts by weight per 100 parts by weight of (A)-(E))

| | Example 3 | Example 4 | Example 5 | Example 6 | Example 7 | Comparative Example 3 | Comparative Example 4 | Comparative Example 5 |
|---|---|---|---|---|---|---|---|---|
| (A) Block copolymer | 31.8 | 31.8 | 31.8 | 31.8 | 31.8 | — | 31.8 | 31.8 |
| (A') EPDM | — | — | — | — | — | 100 | — | — |
| (B) Paraffin oil | 41.0 | 41.0 | 41.0 | 41.0 | 41.0 | — | 41.0 | 41.0 |
| (C) Polyolefin | 4.5 | 4.5 | 4.5 | 4.5 | 4.5 | — | 4.5 | 4.5 |
| (D) Inorganic filler | 12.7 | 12.7 | 12.7 | 12.7 | 12.7 | — | 12.7 | 12.7 |
| (E) PPE | 10.0 | 10.0 | 10.0 | 10.0 | 10.0 | — | 10.0 | 10.0 |
| (F) Silicone resin | 0.9 | 0.9 | 0.9 | 0.9 | 0.9 | — | — | — |
| (G) Metal (oxide) agent | 0.1 | 0.5 | 0.6 | 0.9 | 0.5 | — | — | 0.5 |
| (H) Silicone oil | — | — | — | — | 1.0 | — | — | — |
| Initial hardness (Shore A) | 44 ± 1 | 44 ± 1 | 44 ± 1 | 44 ± 1 | 46 ± 1 | 45 ± 1 | 43 ± 1 | 43 ± 1 |
| 23° C. TS (kgf/cm$^2$) | 70 | 70 | 71 | 70 | 75 | 85 | 67 | 65 |
| 23° C. Elongation (%) | 810 | 820 | 830 | 820 | 800↑ | 890% | 760 | 760 |
| 23° C. Elongation permanent set (%) | 1.3 | 1.3 | 1.3 | 1.3 | 1.5 | 1.3 | 1.3 | 1.3 |
| 100° C. TS (kgf/cm$^2$) | 18.5 | 19 | 18 | 19 | 18 | 15 | 18 | 17 |
| 100° C. Elongation (%) | 410 | 420 | 410 | 400 | 460 | 380 | 390 | 380 |
| 100° C. Elongation permanent set (%) | 7.5 | 7.6 | 7.6 | 7.6 | 6.2 | 6.9 | 7.6 | 7.6 |
| Test-1 for abrasion loss | 0.08 g | 0.08 g | 0.07 g | 0.08 g | 0.02 g | 0.21 g | 0.26 g | 0.26 g |
| Test-2 for abrasion loss (12000 cycles) | 0.4 g | 0.4 g | 0.4 g | 0.4 g | 0.4 g | 2.4 g | 2.8 g | 2.8 g |
| Antifungal activity (ISO 846B) | 4 | 2 | 1 | 0 | 2 | 2 | 5 | 2 |

Methods for evaluation of physical properties
(1) Surface hardness (Shore A) is measured in accordance with KS M 6518.
(2) Tensile strength (kgf/cm$^2$) is measured in accordance with ASTM D638 (KS M 6518).
(3) Elongation (%) is measured in accordance with ASTM D638 (KS M 6518).
(4) Elongation permanent set (%) is measured in accordance with KS M 6518.
(5) Abrasion loss:
(TEST-1) Abrasion loss is measured using a Calibrase wheel set (CS-10 x 2 ea) for 1000 cycles of abrasion under a load of 500 g x 2 ea and at a rotation speed of 70 rpm.
(TEST-2) Abrasion losses are measured using a Calibrase wheel set (CS-17 x 2 ea) for 2000, 4000, 8000 and 12000 cycles of abrasion under a load of 500 g x 2 ea and at a rotation speed of 70 rpm. TEST-1 and TEST-2 are conducted using Taber abrasers (Qmesys) in accordance with ASTM D1175 and D1044, respectively.

Figure 2:
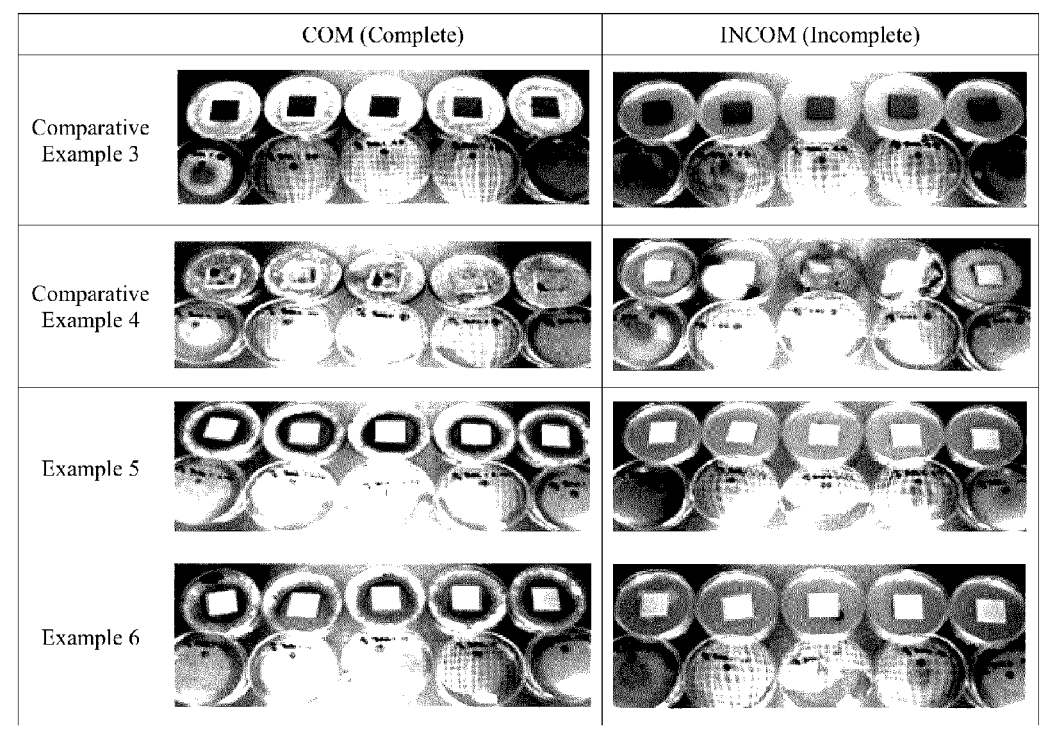

(6) Antifungal activity is measured in accordance with the ISO 846B, judged based on the criteria shown in Table 3, and scored from 0 to 5. The results are shown in Table 1. Photographs showing test results for the antifungal activity of the thermoplastic elastomers of Comparative Examples 3-4 and Examples 5-6 are shown in FIG. 2.

TABLE 3

| Test strains used | Aspergillus niger | ATCC 6275 |
|---|---|---|
| | Penicillium funiculosum | ATCC 11797 |
| | Paecilomyces lilacinus | IAM68212 |
| | Gliocladium virens | ATCC 9645 |
| | Chetomium globosum | ATCC6205 |
| | Chetomium globosum | QM82J |
| | Aureobasidium pullulans | ATCC 9348 |
| | Penicillium pinophilum | ATCC 9644 |
| | Scopulariopsis brevicaulis | KCTC1254 |

TABLE 4

| Medium conditions | Nutrient medium (Inorganic salt agar + Glucose) |
|---|---|
| Spore suspension | Fungal spores (Fungus + inorganic salt solution) + Nutrient (Glucose) |
| Culture conditions | 29 (±1) ° C. × 85% RH × 28 DAYS |
| Remarks | Test method for judging the presence or absence of an ingredient capable of killing the fungus in the material (ASTM G21: Test method for judging the presence or absence of an ingredient as food for the fungus) |

As can be seen from the results in Table 2, when both the metal (oxide)-containing agent and the silicone resin are used, markedly improved abrasion resistance is obtained. As shown in FIG. 2, the thermoplastic elastomers of Examples 5-6 exhibit good antifungal activity as compared to those of Comparative Examples 3-4.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A thermoplastic elastomer comprising: (A) a hydrogenated triblock copolymer having a weight average molecular weight of about 230,000 to about 400,000 g/mol; (B) a non-aromatic oil; (C) a polyolefin resin; (D) an inorganic filler; (E) a polyphenylene ether resin; and (F) a blend of a silicone resin and a polyolefin, wherein the thermoplastic elastomer has a tensile strength of about 63 kgf/cm$^2$ or more, as measured at 23° C. in accordance with ASTM D638, and an abrasion loss of about 0.2 g or less, as measured in accordance with ASTM D1175 (1000 cycles), having an elongation permanent set (%) of 1.3 to 1.5 at 23° C. measured is accordance with KS M 6518, wherein the thermoplastic elastomer comprises: about 25 to about 55% by weight of the hydrogenated triblock copolymer (A), about 20 to about 50% by weight of the non-aromatic oil (B), about 5 to about 15% by weight of the polyolefin resin (C), about 5 to about 20% by weight of the inorganic filler (D), and about 3 to about 15% by weight of the polyphenylene ether resin (E); and about 0.01 to 5 parts by weight of the blend of a silicone resin and a polyolefin (F), wherein the amounts are based on 100 parts by weight of (A), (B), (C), (D), (E), and (F).

2. The thermoplastic elastomer according to claim 1, further comprising (G) a metal (oxide)-containing agent.

3. The thermoplastic elastomer according to claim 1, wherein the thermoplastic elastomer has a surface hardness (Shore A) of about 0.1 to about 50 A, as measured in accordance with KS M 6518.

4. The thermoplastic elastomer according to claim 1, further comprising about 0.1 to about 3 parts by, weight of a metal (oxide)-containing agent (G), based on 100 parts by weight of (A), (B), (C), (D), (E) and (F).

5. The thermoplastic elastomer according to claim 1, wherein the hydrogenated triblock copolymer (A) comprises about 20 to about 35% by weight of an aromatic vinyl polymer block.

6. The thermoplastic elastomer according to claim 1, wherein the hydrogenated triblock copolymer (A) is selected from the group consisting of a styrene-ethylene-butylene-styrene (SEBS) bock copolymer, a styrene-ethylene-propylene-styrene (SEPS) block copolymer, a styrene-ethylene-ethylene-propylene-styrene (SEEPS) block copolyrner, or a combination thereof.

7. The thermoplastic elastomer according to claim 1, wherein the non.- aromatic oil (B) comprises a paraffin oil.

8. The thermoplastic elastomer according to claim 1, wherein the polyolefin resin (C) has a melt index (230° C., 2.16 kg) of about 10 to about 50 g/10 min.

9. The thermoplastic elastomer according to claim 1, wherein the polyolefin resin (C) is selected from the group consisting of a polyethylene resin, a polypropylene resin, a polybutylene resin, an ethylene-propylene copolymer resin, an ethylene-vinyl alcohol copolymer resin, or a combination thereof.

10. The thermoplastic elastomer according to claim 1, wherein the inorganic filler (D) is selected from the group consisting of calcium carbonate, talc, clay, silica, mica, carbon black, graphite, wollastonite, carbon nanotubes, calcium silicate, magnesium carbonate, or a combination thereof.

11. The thermoplastic elastomer according to claim 1, wherein the polyphenylene ether resin (E) has a weight average molecular weight of about 20,000 to about 60,000 g/mol.

12. The thermoplastic elastomer according to claim 1, wherein the blend of a silicone resin and a polyolefin (F) comprises a polyolefin and a silicone rubber in a weight ratio of about 1:0.5 to about 1:1.5.

13. The thermoplastic elastomer according to claim 2, wherein the metal (oxide) is selected from the group consisting of silver, gold, platinum, aluminum, iron, chromium, nickel, copper, palladium, tin, cobalt, zinc, titanium, zirconium, hafnium, vanadium, niobium, molybdenum, tungsten, manganese, rhodium, lead, antimony, tin, an oxide thereof, or an alloy of two or more thereof.

14. The thermoplastic elastomer according to claim 2, wherein the metal (oxide) has an average particle diameter (D50) of about 1 to about 100 nm.

15. The thermoplastic elastomer according to claim 1, further comprising a silicone oil.

16. The thermoplastic elastomer according to claim 1, further comprising an additive selected from the group consisting of antimicrobial agents, heat stabilizers, antioxidants, release agents, light stabilizers, surfactants, coupling agents, plasticizers, admixtures, colorants, stabilizers, lubricants, antistatic agents, toning agents, flame-proofing agents, weather stabilizers, UV absorbers, UV blocking agents, flame retardants, fillers, nucleating agents, adhesion aids, adhesives, and combinations thereof.

17. A molded article comprising the thermoplastic elastomer according to claim 1.

18. A diaphragm comprising the thermoplastic elastomer according to claim 1 wherein the diaphragm has a tensile strength of about 63 kgf/cm$^2$ or more, as measured at 23° C. in accordance with ASTM D638, and an abrasion loss of about 0.2 g or less, as measured in accordance with ASTM D1175 (1000 cycles).

19. The thermoplastic elastomer according to claim 1, wherein the (A) hydrogenated triblock copolymer comprises a styrene-ethylene-butylene-styrene (SEBS) block copolymer; the polyolefin resin (C) comprises as polypropylene resin; and the inorganic filler (D) comprises calcium carbonate.

20. The thermoplastic elastomer according to claim 19, further comprising (G) a metal (oxide)-containing agent comprising silver.

21. The thermoplastic elastomer according to claim 20, further comprising a flame retardant.

22. The thermoplastic elastomer according to claim 1, wherein the (F) blend of a silicone resin and a polyolefin is a blend consisting of a silicone rubber and a polyolefin.

* * * * *

UNITED STATES PATENT AND TRADEMARK OFFICE
CERTIFICATE OF CORRECTION

Page 1 of 1

PATENT NO. : 9,534,113 B2
APPLICATION NO. : 13/924927
DATED : January 3, 2017
INVENTOR(S) : Bum Seok Youn et al.

It is certified that error appears in the above-identified patent and that said Letters Patent is hereby corrected as shown below:

In the Claims

Column 15, Claim 1 delete Line 30 and insert: --measured in accordance with KSM 6518, wherein the--

Column 15, Claim 6 delete Line 58 and insert: --styrene (SEBS) block copolymer, a styrene-ethylene-propyl- --

Column 15, Claim 6 delete Line 60 and insert: --ethylene-propylene-styrene (SEEPS) block copolymer, or a--

Column 16, Claim 19 delete Line 55 and insert: --mer; the polyolefin resin (C) comprises a polypropylene--

Signed and Sealed this
Eleventh Day of April, 2017

Michelle K. Lee
*Director of the United States Patent and Trademark Office*